H. VIDETTO.
LINK PRESS.
APPLICATION FILED OCT. 29, 1914.
1,137,813.
Patented May 4, 1915.
2 SHEETS—SHEET 2.
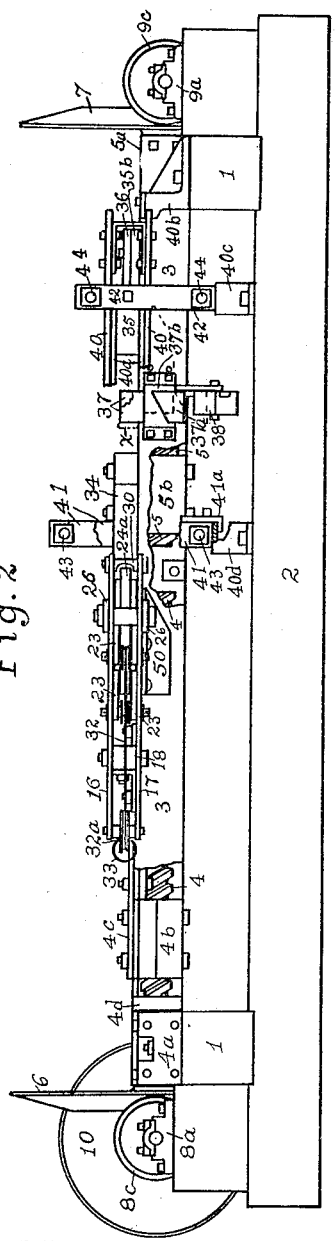
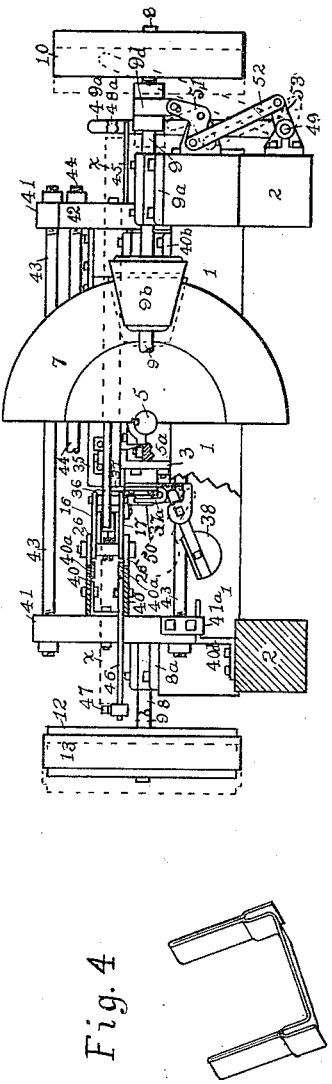
WITNESSES
John L. Thomas
R. S. Simpson
INVENTOR
Harold Videtto
BY
David E. Lain
ATTORNEY ual parts of the machine.

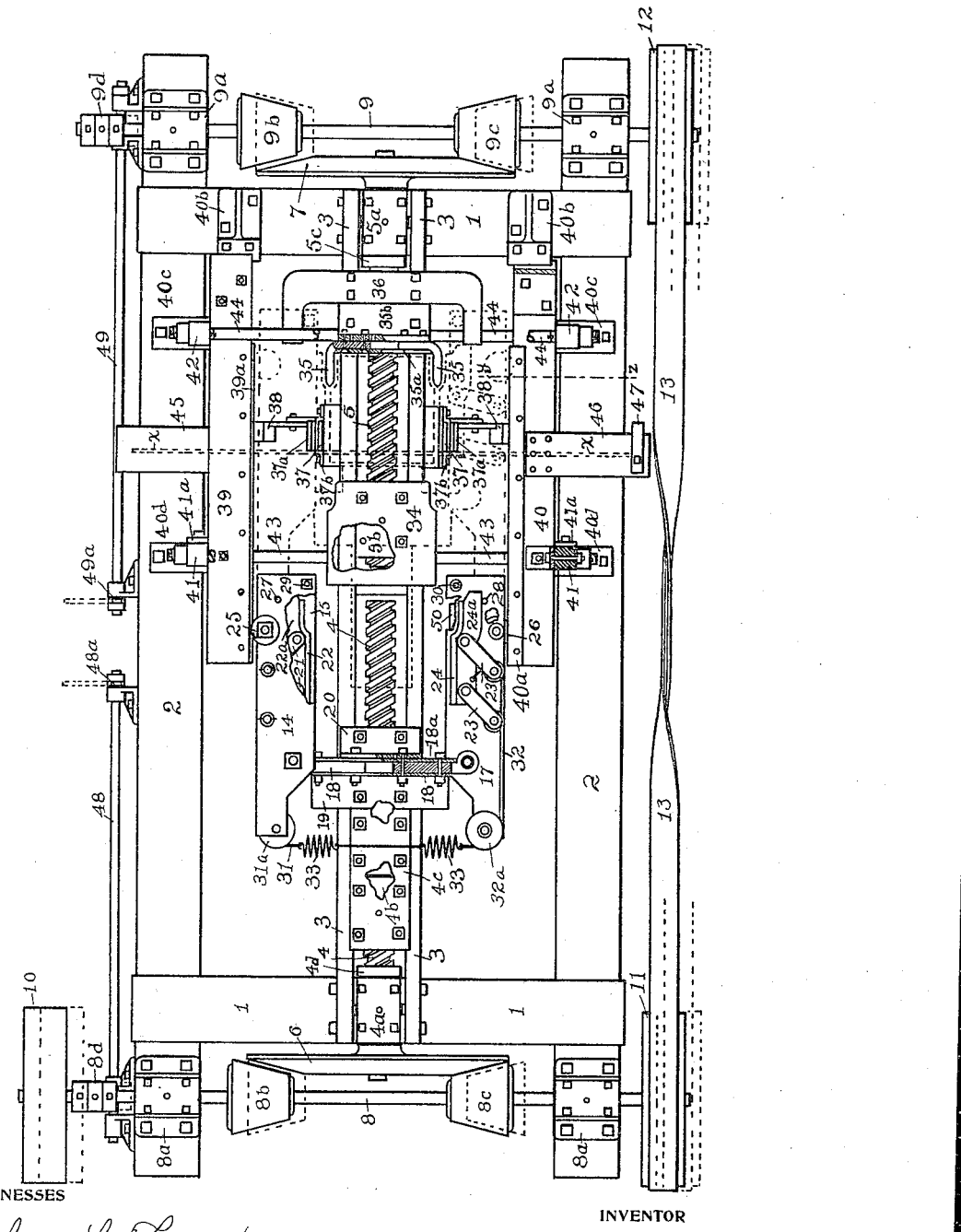

UNITED STATES PATENT OFFICE.

HAROLD VIDETTO, OF BELLINGHAM, WASHINGTON.

LINK-PRESS.

1,137,813.

Specification of Letters Patent.

Patented May 4, 1915.

Application filed October 29, 1914. Serial No. 869,215.

*To all whom it may concern:*

Be it known that I, HAROLD VIDETTO, a citizen of the United States, and a resident of Bellingham, in the county of Whatcom and State of Washington, have invented certain new and useful Improvements in Link-Presses, of which the following is a specification.

My invention relates to improvements in presses for forming the links suited for use in sawdust conveyers and the like and the objects of my invention are to provide a machine in which a red-hot bar of iron may be placed and by the operations of the machine shaped into the desired form, to have the operations of the machine so simple that an unskilled operative may successfully control its movements, to provide for the forming of links of different dimensions by means of simple adjustments and the interchange of a few easily removable parts, and to so balance the strains within the machine that they are resisted by metal advantageously placed for that purpose, and so that the parts used for forming may be self adjusting. I attain these objects by the mechanism illustrated in the accompanying two sheets of drawings in which—

Figure 1 is a plan view of my machine from above; Fig. 2 is a side elevation; and Fig. 3 is an end elevation of the same; while Fig. 4 illustrates the kind of link formed in my machine.

Similar letters refer to similar parts throughout the several views.

Certain parts are omitted or broken into in order to show other parts hidden thereby. And the left hand side of Fig. 3 is partly in section on the line $yz$ of Fig. 1.

The supporting frame of my machine consists of the two cross beams 1 resting on and secured to the two side beams 2.

The central and principal resisting frame consists of two angle bars 3 placed horizontal, parallel and bolted to the two pillow-block bearings $4^a$ and $5^a$ which are in turn bolted to end beams 1, 1. The shorter sides of these angle bars are at the top and placed edges juxtaposed. The upper surface of these short sides of said angle bars 3, 3 are in a plane and together said short sides form guides in which slide nuts $4^b$ and $5^b$ on press screws 4 and 5 respectively. The left hand end of screw 4 is reduced to a cylinder, mounted for rotation in pillow block bearing $4^a$ rigidly attached as a shaft to conical friction wheel 6 and bears the nut $4^b$. Between the end of the thread and the bearing $4^a$ a thrust ring $4^d$ is placed.

The right hand end of screw 5 is reduced to a cylinder, mounted for rotation in pillow block bearing $5^a$ rigidly attached as a shaft to conical friction wheel 7 and bears nut $5^b$. Between the end of the thread and the bearing $5^a$ a thrust ring $5^c$ is placed. Conical friction, drive wheels $8^b$ and $8^c$ are rigidly mounted on horizontal shaft 8 and said shaft is mounted for rotation in the plane of the center line of screw 4, in bearings $8^a$, $8^a$, in such manner that an endwise movement of said shaft will cause either of wheels $8^b$ or $8^c$ to have frictional contact with wheel 6. First driver pulley 10 is rigidly mounted on one end of shaft 8, and second driver pulley 11 is rigidly mounted on the other end of said shaft. Similarly, conical, friction, drive wheels $9^b$ and $9^c$ are rigidly mounted on horizontal shaft 9 and said shaft is mounted for rotation in the plane of the center line of screw 5 in bearings $9^a$, $9^a$, in such manner that an endwise movement of said shaft will cause either of wheels $9^b$ or $9^c$ to have frictional contact with wheel 7. Shaft 9 has driven pulley 12 rigidly mounted on the end which will bring said pulley in belting relation with pulley 11. Pulleys 11 and 12 are connected with a crossed belt 13. Nut $4^b$ is rigidly connected to horizontal cross head 18 by slide $4^c$ and angle brackets which are suited to engage with and slide on the guides provided by angle bars 3, 3.

On one end of cross head 18 is pivoted for partial horizontal rotation an arm comprising two horizontal, parallel plates 16 and 17, see Figs. 2 and 3. Plate 16 is omitted from Fig. 1. Pair of wheels 26, 26 are mounted for rotation above and below arm 16, 17 on a vertical bolt through the same and extend beyond the outside of said arm. The bolt on which these wheels revolve passes through a sleeve between plates 16 and 17, holding said plates separated at a distance determined by the thickness of cross head 18. Bolt and sleeve 30 located at the forward inside corner of arm 16, 17 serve a similar spacing function and also act as a bending means to bend the bar from which a link is being formed. Forming shoe 24, having rib $24^a$, is mounted between plates 16 and 17 for parallel motion on two pairs of links 23, 23 which are pivoted to said plates constituting a knuckle joint between said shoe and said arm. Stop pin 28 limits the outward motion of said shoe. The pins which connect each pair of links 23, 23 to arm 16, 17 bear a sheave between said links. Sheave 32$^a$ is mounted for rotation between the left hand ends of plates 16 and 17 on a pin through said plates. Arm 14, 15 pivoted to the other end of cross head 18 is constructed and furnished in every way similar to arm 16, 17 above described except that it is a mirror image of arm 16, 17. The pairs of links attached to arm 14, 15 are numbered 21, 21, and the forming shoe connected to these links is numbered 22, its rib is numbered 22$^a$, and the corner bolt and sleeve are numbered 19. A short cable 32 is attached to rib 24$^a$ of shoe 24, passes over the sheaves between pairs of links 23, 23, over sheave 32$^a$, and is attached to one end of spring 33. Cable 31 is similarly attached to rib 22$^a$ on shoe 22, passes over sheaves between pairs of links 21, over sheave 31$^a$, and is attached to the other end of spring 33. The spring 33 and cables 31 and 32 as shown serve to hold forming shoe 22 under spring pressure against stop pin 27, and pairs of wheels 25, 26 under similar pressure against guide plates 39 and 40 respectively.

Forming block 34 lies on top of angle bars 3, 3, is bolted to nut 5$^b$ and when driven thereby slides on top of said angle bars 3, 3. Its right hand end is of diminished width as shown.

Horn die 35 with spacing bar 35$^a$ is rigidly attached to angle bracket 35$^b$ which is in turn bolted to the top of angle bars 3, 3. Said horn die lies on top of angle bars 3, 3 and is so located and of such dimensions that when block 34 is in its extreme right hand position, indicated in dotted outline, its smaller or right hand end is separated from said horn die and spacing bar 35$^a$ only by the thickness of the bar from which the conveyer links are to be made.

Two turning pins 37, 37 are mounted for vertical movement in guide housings or slideways 37$^b$, 37$^b$ which are rigidly attached by screws to angle bars 3, 3. Said pins 37, 37 are located on each side of block 34 near its left hand end when in its dotted-outline position. The lower ends 37$^a$, 37$^a$ of these pins are bent upward and outward and stand along side of said housings. Each of said pins 37, 37 is retained in place in said housing and forced to its upper limit in the same by one of counterweights 38, 38 acting on a lever pivoted to a support attached to said housing. The upper ends of 37$^a$, 37$^a$ are beveled downward toward the left and each is so located as to be in the line of movement of one of inclined depressors 50, 50, one of which is dependent from and attached to the lower side of each of arm plates 15 and 17. When depressors 50, 50 are in their extreme right hand position, as indicated in dotted outline in Fig. 2, then upturned ends 37$^a$, 37$^a$ are in their lower position, counterweights 38, 38 are in their upper or dotted-outline position and the top of pins 37, 37 are slightly below the top of angle bars 3, 3.

U-stop bar 36 is bolted to the top of angle bars 3, 3 and is so located that the ends of its legs come in contact with and prevent further longitudinal movement toward the right of shoe ribs 22$^a$ and 24$^a$ and serve as slideways over which said shoe ribs move toward each other when cross head 18 and arms 14, 15 and 16, 17 are being moved to their extreme right-hand position indicated in dotted outline. Two pairs of guide plates 39 and 40 are rigidly attached to two pairs of buckstay bars 41 and 42. The bars are connected in pairs by the two pairs of buckstay rods 43 and 44. The plates in each pair 39, 39 and 40, 40 are rigidly bound together by the U brackets by which they are attached to the buckstay bars. Also the plates of each pair are parallel and horizontal, at the same distance apart as the wheels 25, 25 and 26, 26 and said pairs are placed one on each side of angle bars 3, 3 and parallel with and equidistant therefrom. To the inside of plates 40, 40 is attached the guide bars 40$^a$, 40$^a$ and similarly the guide bars 39$^a$, 39$^a$ are attached to the plates 39, 39. These guide bars prevent vertical movement of the arms 15, 15 and 16, 17 when the wheels on these arms are running along the edges of said guide plates. To the lower guide plate 39 on its upper surface is attached floor plate 45, while to the lower plate 40 is similarly attached floor plate 46. The upper surface of floor plates 45 and 46, lower guide bars 39$^a$ and 40$^a$, arm plates 15 and 17 and angle bars 3, 3 are all in the same horizontal plane and comprise the floor of the machine. Attached to the outer end of floor plate 46 is clamp stop 47.

The lower ends of buckstay bars 42 rest upon and may slide on brackets 40$^c$ attached to beams 2. The lower ends of buckstay bars 41 rest upon and may slide on brackets 40$^d$ attached to beams 2, and this pair of buckstay bars are further secured to said brackets by clips 41$^a$, 41$^a$ which are attached to said bars and engage with said brackets to prevent said bars moving upward or toward the left hand while leaving them free to move in a direction across the machine. The right hand ends of the lower guide plates 39 and 40 are engaged as slides in guide brackets 40$^b$, 40$^b$, which are attached to right-hand end beam 1. This connection allows freedom of movement of said guide plates across the machine but prevent movement vertically or toward the right hand. Hence the distance of the pair of guide plates 39 from the pair of guide plates 40 is manually adjustable by revolving the nuts on the two pairs of buckstay rods 43 and 44, and the force of spring 33 acting to spread the outer ends of arms 14, 15 and 16, 17 apart serves to hold the guide plates 39 and 40 and the buckstay bars to which they are attached firmly against the nuts of said buckstay rods. But the frame work comprising the two pairs of guide plates 39 and 40, the two pairs of buckstay bars 41 and 42 and the two pairs of buckstay rods 43 and 44 is free to automatically move across the machine as a unit on guide brackets $40^c$, $40^c$ and $40^d$, $40^d$ in adjustment about forming block 34 but cannot move longitudinally or vertically.

Shifter shaft 49 is mounted horizontally for rotation in bearings attached to right-hand side beam 2, Figs. 1 and 3. The inner end of this shaft is near the middle of the side of the machine and is provided with hand lever $49^a$; while to the outer end of shaft 49 is rigidly attached the crank 53 placed vertically beneath the shaft 9. A link 52 connects said crank with bell crank 51 which is mounted on a bearing attached to the said machine frame. The other end of bell crank 51 has a slotted hole and is connected to collar $9^d$, which is mounted on shaft 9 between two set rings. Thus by the movement of hand lever $49^a$ from its full line to its dotted-outline position, the shaft 9 with friction wheels and pulley thereon, is moved from its full line to its dotted-outline position. In a similar manner shifting shaft 48 is mounted and connected to collar $8^d$ which is mounted on shaft 8 between two set rings. And the movement of hand lever $48^a$ from its full line to its dotted-outline position will cause shaft 8 and the friction wheels and pulleys thereon to move from their full line to their dotted-outline position. Then assuming driver pulley 10 turned by a source of power not shown, in such a direction that when hand levers $48^a$ and $49^a$ are firmly held in their full-line positions screws 4 and 5 will be revolved in the same direction and nuts $4^b$ and $5^b$ will be carried toward the right hand, taking arms 14, 15 and 16, 17 and block 34 from their full-line to their dotted-line positions. And this movement can be stopped at any time by releasing pressure on said hand levers. Furthermore said parts can be returned to their full-line positions holding said levers in their dotted-outline positions. Also by pressing the proper hand lever either said arms or said block can be carried back and forth separately, within the limits of their movements, provided the other is not in the way.

To form conveyer links with this machine a red-hot bar X of the proper length, width and thickness shown in dotted outline, is placed on edge across the machine, one end against stop clamp 47 and standing against the left hand sides of turning pins 37, 37. Now assume that pulley 10 is driven as before and that hand levers $48^a$ and $49^a$ are both in a position midway between their full-line and dotted-outline positions, then friction driver wheels $8^b$ and $8^c$ will both be out of contact with friction wheel 6 and friction driver wheels $9^b$ and $9^c$, out of contact with friction wheel 7. Then press and hold lever $49^a$ in its full-line position and driver friction wheel $9^c$ will cause friction wheel 7 to revolve screw 5 in a direction to move nut $5^b$ and forming block 34 toward the right hand. The forward movement of block 34 will double up bar X between pins 37, 37 and carry the middle part of said bar with it to lie between spacing bar $35^a$, the horns of horn die 35 and the end of said block 34 when said block is in its dotted-outline position. Pressure is now removed from hand lever $49^a$ and applied to hand lever $48^a$, carrying and holding it in its full-line position, when the driver friction wheel $8^c$ will be forced into driving contact with friction wheel 6 and screw 4 will be caused to revolve in such manner as to carry nut $4^b$, cross head 18 and arms 14, 15 and 16, 17 toward the right hand. Sleeved bolts 29 and 30 will come in contact with the bar X near its ends and bend them forward around turning pins 37, 37 and carry these ends forward until they lie along side the other parts of said bar X and the horns of horn die 35.

Pins 29 and 30 are somewhat nearer the juxtaposed edges of arms 14, 15 and 16, 17 than are the forming shoes 22, 24 when the ribs $22^a$, $22^b$ on the same are against stop pins 27, 28. So that said forming shoes do not come in contact with bar X until the ends of said shoe ribs $22^a$ and $22^b$ come in contact with the ends of U-stop bar 36.

It should be noted that the function of buckstay bars 41, 41 and 42, 42 with their rods 43, 43 and 44, 44 is to retain guide plates 39, 39 and 40, 40 at such a distance apart that wheels 25, 25 and 26, 26 running on said guide plates will retain the forward end of arms 14, 15 and 16, 17 at the proper operative distance apart against any pressure tending to separate them originating during the operation of the machine. While the movement in adjustment back and forth of said guide plates 39, 39 and 40, 40 on slideways formed by guide brackets $40^b$, $40^b$ and $40^d$, $40^d$ is automatic.

Inclined depressor plates 50, 50 are so located that turning pins 37, 37 remain in their full-line position until the bending of bar X around them by advancing pins 29, 30 is fully accomplished; then these depressors begin to force said pins 37, 37 downward against the weight of counter balances 38, 38, and when the advancing forming-shoe ribs 22ª, 24ª have come in contact with the ends of U-stop bar 36, said pins 37, 37 have been carried down to their dotted-outline position and are entirely below the floor level. Then, since forming shoes 22, 24 can advance no farther with arms 14, 15 and 16, 17, pairs of links 21, 21 and 23, 23 force said forming shoes toward each other and toward the folded bar X in a direction at right angles to the direction of motion of said arms and press the loose folds of said bar X together and against the sides of forming block 34, and press the ends of said bar X against the outside of the horns of horn die 35. Thus when arms 14, 15 and 16, 17 have reached their position indicated in dotted outline the bar X has been formed into the shape of the conveyer link shown in Fig. 4. Now by properly working hand levers 48ª and 49ª cross head 18 and attachments and forming block 34 are driven back to their full-line positions, the newly formed conveyer link is removed and turning pins 37, 37 are returned to their full-line position through the operation of counterweights 38, 38. When the machine is ready for another hot bar X.

Cross head 18 is preferably in two parts which are separated by a space equal to the amount it is desired to change the width of the links to be formed in this machine. Spacing bar 18ª is suited for one width of link only. The bolt holes in the standing edges of brackets 19 and 20 are slotted to permit of slight adjustment of the length of cross head 18 and also other sets of slotted holes are provided in these brackets to provide for shortening said cross head for forming narrower links. Therefore by providing another spacing bar 18ª and using another set of said slotted holes, cross head 18 can be shortened to be of the length requisite for one or more narrower widths of links. Horn die 35 and bracket 35ᵇ are preferably arranged for shortening said horn die in a manner similar to cross head 18 and its retaining brackets. Spacing bar 35ª being also suited to but one width of link. A new block 34 must be provided for each width of link to be formed. By providing narrower blocks between turning-pin housings 37ᵇ, 37ᵇ and the angle bars 3, 3 these pins can be placed in the new positions required for forming narrower links. Also the nuts on buckstay-bar rods 43, 43 and 44, 44 are operated to adjust the distance between guide plates 39 and 40 to provide for forming the narrower links. While shorter links can be formed by moving pin housings 37ᵇ, 37ᵇ to a position farther toward the right, for which other sets of tapped holes are provided in angle bars 3, 3, one set of which is shown in Fig. 2.

In the operation of this machine the freedom of transverse motion afforded the guide plate structure as described allows of freedom of traverse adjustment about the forming block 34 that saves the retaining structure from undue strains. The use of friction drive 8ᵇ, 8ᶜ, to rotate screw 4 and friction drive 9ᵇ, 9ᶜ, to rotate screw 5 is considered important as they save the entire machine from strains likely to occur if they were gear drives as usual.

Having thus fully described a preferred structure to embody my invention what I claim as new and desire to secure by Letters Patent is,

1. In a machine of the character described the combination of a reciprocable crosshead, slideways for said crosshead, two arms pivotally connected to said crosshead and also adapted to move on transversely automatically-adjustable slideways parallel to said crosshead slideways, and said automatically-adjustable slideways, with means to reciprocate said crosshead.

2. In a machine of the character described the combination of a reciprocable crosshead, slideways for said crosshead, two arms reciprocable along with said crosshead and each being pivoted at one end to said crosshead and having their other ends suited to be guided by transversely, automatically adjustable slideways which are parallel with said crosshead slideways, said automatically adjustable slideways, and two forming shoes each being connected by a knuckle joint with one of the said other ends of said arms, with means to reciprocate said crosshead.

3. In a machine of the character described the combination of a reciprocable crosshead, slideways for said crosshead, two arms reciprocable along with said crosshead and each being pivoted at one end to said crosshead and having their other ends suited to be guided in their movements by transversely, automatically adjustable slideways which are parallel with said crosshead slideways, said automatically adjustable slideways, two forming shoes each being connected by a knuckle joint with one of the said other ends of said arms, and two slideway stops located in the paths of movement of said forming shoes and the guiding surface of said stops being at right angles with said crosshead slideways, with means to reciprocate said crosshead.

4. In a machine of the character described the combination with a rigidly attached die, a slidable forming block operable by a pressure means, said pressure means and guiding means for said forming block, of two withdrawable turning pins, guiding means for said pins, two bending means, guiding means for said bending means, two longitudinally and transversely movable forming shoes, directing means for said shoes, and another pressure means to operate said turning pins, said bending means, and said forming shoes.

5. In a machine of the character described the combination with a crosshead, slideways for the said crosshead, two arms pivotally connected to said crosshead, automatically adjustable slideways for guiding the outer ends of said arms, two forming shoes, knuckle joints between each of said forming shoes and each of said arms, a spring, a flexible connection between said spring and said shoes and said arms, and fixed stops in the path of movement of said forming shoes, of pressure means to reciprocate said crosshead.

6. In a machine of the character described the combination of a reciprocable crosshead, slideways for said crosshead, means to reciprocate said crosshead, two arms each pivotally connected at one end with said crosshead and reciprocable therewith and having their other ends guidable by slideways parallel to said crosshead slideways, said slideways parallel with said crosshead slideways, two forming shoes each connected to one of said other ends of said arms for parallel motion, two slideway stops located in the paths of longitudinal movement of said forming shoes and having their slideways at right angles to said crosshead slideways, a reciprocable forming block, slideways for said forming block parallel with said crosshead slideways, and means to reciprocate said forming block, with a rigidly attached die.

7. In a machine of the character described the combination of a rigidly attached die, a slidable forming block operable by a pressure means, said pressure means, guiding means for said forming block, two withdrawable turning pins, guiding means for said pins, two bending means, guiding means for said bending means, two longitudinally and transversely movable forming shoes, directing means for said shoes, and another pressure means to operate said turning pins, said bending means and said forming shoes, with two separately controllable, reversible friction drives, each of said drives adapted to operate one of said pressure means.

Signed at Bellingham in the county of Whatcom and State of Washington this 23rd day of October A. D. 1914.

HAROLD VIDETTO.

Witnesses:
R. S. SIMPSON,
JOHN L. THOMAS.

Copies of this patent may be obtained for five cents each, by addressing the " Commissioner of Patents, Washington, D. C."